United States Patent
Zheng et al.

(10) Patent No.: US 12,156,278 B2
(45) Date of Patent: Nov. 26, 2024

(54) COMMUNICATION METHOD AND APPARATUS

(71) Applicant: HUAWEI TECHNOLOGIES CO., LTD., Guangdong (CN)

(72) Inventors: Lili Zheng, Shanghai (CN); Qinghai Zeng, Shanghai (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 548 days.

(21) Appl. No.: 17/485,683

(22) Filed: Sep. 27, 2021

(65) Prior Publication Data
US 2022/0015189 A1    Jan. 13, 2022

Related U.S. Application Data

(63) Continuation of application No. PCT/CN2020/081456, filed on Mar. 26, 2020.

(30) Foreign Application Priority Data

Mar. 28, 2019 (CN) .......................... 201910245772.4

(51) Int. Cl.
H04W 76/00 (2018.01)
H04W 52/02 (2009.01)
H04W 76/28 (2018.01)

(52) U.S. Cl.
CPC ....... *H04W 76/28* (2018.02); *H04W 52/0216* (2013.01)

(58) Field of Classification Search
CPC .......................... H04W 76/28; H04W 52/0216
See application file for complete search history.

(56) References Cited

U.S. PATENT DOCUMENTS 9,578,675 B2 * 2/2017 Lee .................. H04W 72/23
2013/0294307 A1 11/2013 Johansson et al.
2016/0073446 A1 * 3/2016 Lou .................. H04W 76/28
370/311

(Continued)

FOREIGN PATENT DOCUMENTS

CN      102932882 A    2/2013
CN      103945505 A    7/2014

(Continued)

OTHER PUBLICATIONS

Notice of Allowance dated Aug. 3, 2022 issued for Chinese Application No. 201910245772.4 (4 pages).

(Continued)

*Primary Examiner* — Erika A Washington

(57) ABSTRACT

This application provides a communication method and apparatus, to determine a DRX cycle. The method includes: receiving data in an active time of a current DRX cycle; when a DRX inactivity timer of the current DRX cycle expires, determining a type of a next DRX cycle depending on whether at least some data received in the active time is associated with a DRX short cycle, where if the at least some data is not associated with a DRX short cycle, the next DRX cycle is a DRX long cycle, or the type of the next DRX cycle is the same as that of a DRX cycle previous to the current DRX cycle. When the DRX inactivity timer expires, the type of the next DRX cycle can be more flexibly determined, and may not necessarily be a DRX short cycle. This can save power of a device to some extent.

12 Claims, 7 Drawing Sheets

---

Receive data in an active time of a current DRX cycle — S410

When a DRX inactivity timer of the current DRX cycle expires, determine a type of a next DRX cycle depending on whether at least some data received in the active time is associated with a DRX short cycle, where if the at least some data is not associated with a DRX short cycle, the next DRX cycle is a DRX long cycle, or the type of the next DRX cycle is the same as that of a DRX cycle previous to the current DRX cycle — S420

(56) References Cited

U.S. PATENT DOCUMENTS

2018/0338332 A1* 11/2018 Lee .................. H04W 52/0216
2020/0015312 A1   1/2020 He et al.

FOREIGN PATENT DOCUMENTS

| CN | 104219738 A | 12/2014 |
| CN | 107197508 A | 9/2017 |
| CN | 108307547 A | 7/2018 |
| EP | 2621242 A1 | 7/2013 |
| EP | 2833663 A1 | 2/2015 |
| EP | 3419365 A1 | 12/2018 |
| WO | 2018059564 A1 | 4/2018 |
| WO | 2018082542 A1 | 5/2018 |
| WO | 2018213120 A1 | 11/2018 |
| WO | 2019033017 A1 | 2/2019 |

OTHER PUBLICATIONS

Extended European Search Report issued in EP20778362.2, dated Mar. 17, 2022, 11 pages.

3GPP TS 36.321 V15.4.0 (Dec. 2018); 3rd Generation Partnership Project;Technical Specification Group Radio Access Network;Evolved Universal Terrestrial Radio Access (E-UTRA); Medium Access Control (MAC) protocol specification (Release 15), total 131 pages.

3GPP TS 38.321 V15.4.0: "3rd Generation Partnership Project; Technical Specification Group Radio Access Network; NR;Medium Access Control (MAC) protocol specification (Release 15)", Dec. 2018, total 77 pages.

3GPP TSG-RAN2 Meeting #61bis, R2-082503,36.321 Cr covering agreements of RAN2 #61bis, MAC Rapporteurs (Qualcomm Europe, Ericsson), Shenzhen, China, Mar. 31-Apr. 4, 2008, total 35 pages.

3GPP TSG-RAN WG4 Meeting # 76bis, R4-155791, On the necessity of introduction of DRX based RRM requirements for HST, Huawei, HiSilicon, Sophia Antipolis, France, Oct. 12-16, 2015, total 6 pages.

Office Action issued in CN201910245772.4 dated Mar. 18, 2021, total 8 pages.

Communication pursuant to Article 94(3) EPC dated Apr. 3, 2023 issued for European Application No. 20 778 362.2 1 (6 pages).

Communication pursuant to Article 94(3) EPC dated Jan. 29, 2024, issued for European Application No. 20 778 362.2 (7 pages).

* cited by examiner

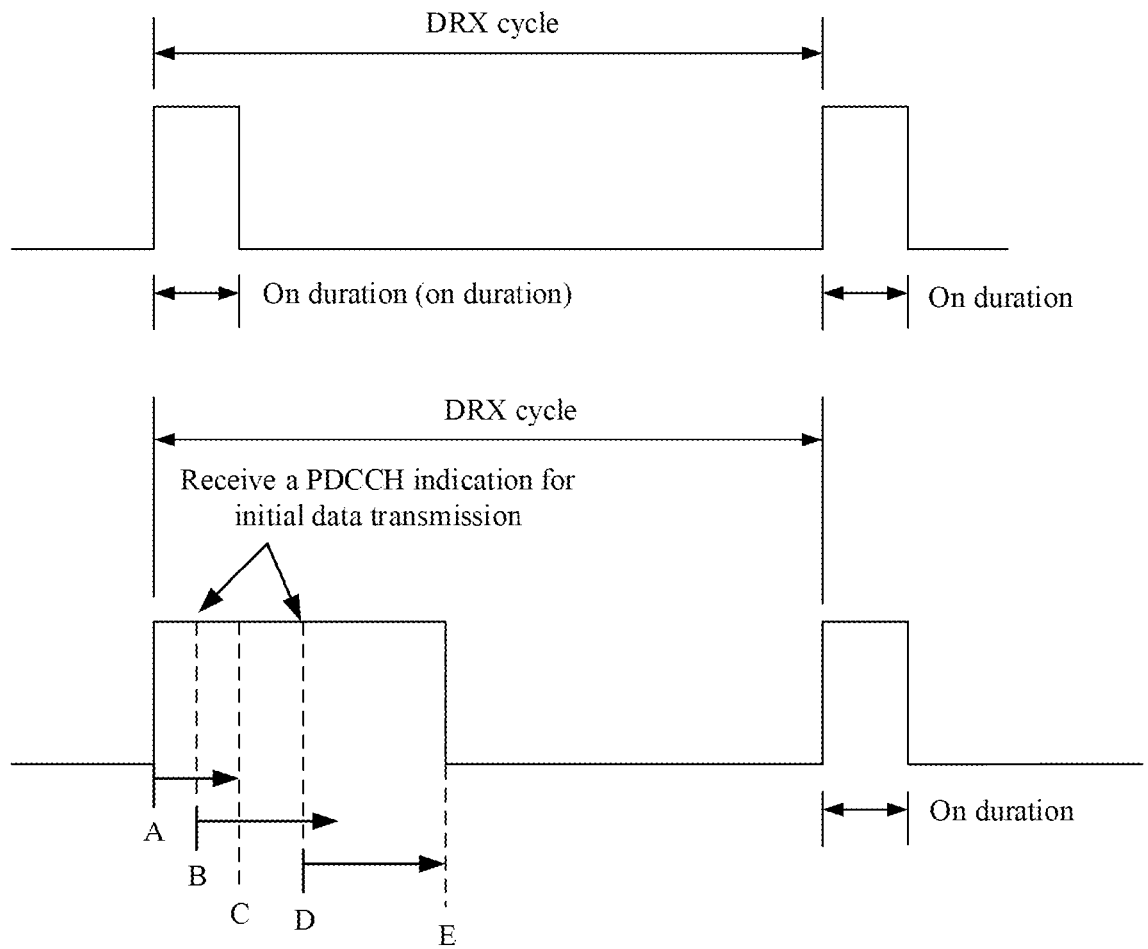

A: An on duration timer is started, and a terminal device enters an on duration
B: A PDCCH indication for initial data transmission is received, and a DRX inactivity timer is started
C: The on duration timer expires, and because the DRX inactivity timer is running, the terminal device does not enter a sleep state and remains in an active state
D: The PDCCH indication for initial data transmission is received, and the DRX inactivity timer is restarted
E: The DRX inactivity timer expires, and the terminal device enters the sleep state

FIG. 2

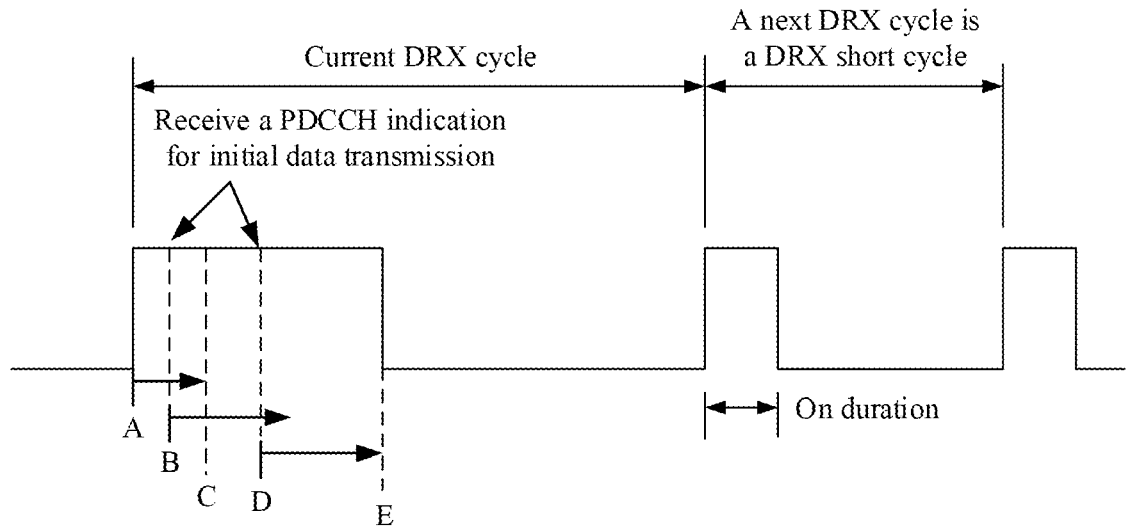

A: An on duration timer is started, and a terminal device enters an on duration
B: A PDCCH indication for initial data transmission is received, and a DRX inactivity timer is started
C: The on duration timer expires, and because the DRX inactivity timer is running, the terminal device does not enter a sleep state and remains in an active state
D: The PDCCH indication for initial data transmission is received, and the DRX inactivity timer is restarted
E: The DRX inactivity timer expires, and the terminal device enters the sleep state

FIG. 3

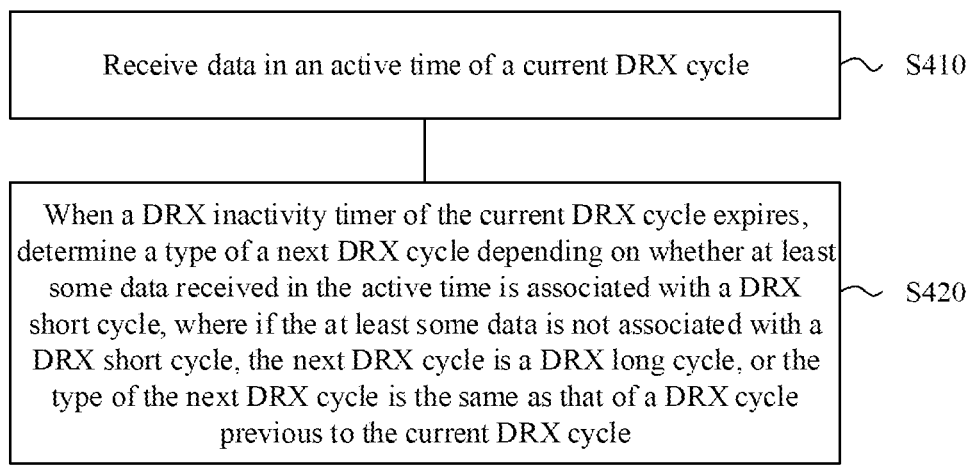

FIG. 4

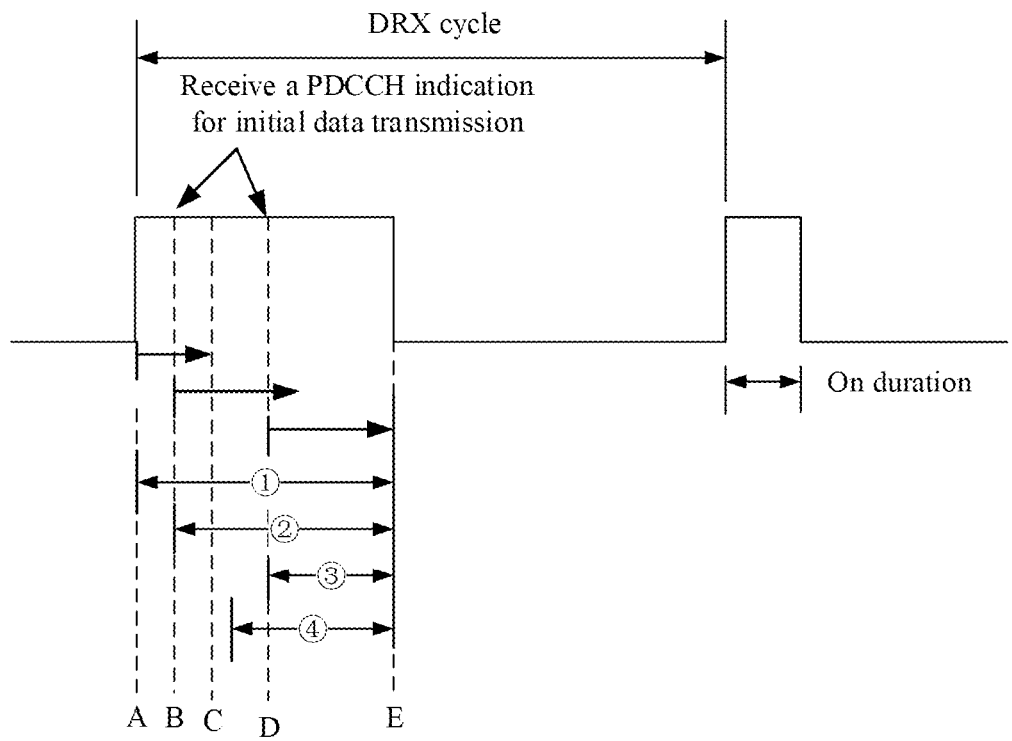

A: An on duration timer is started, and a terminal device enters an on duration
B: A PDCCH indication for initial data transmission is received, and a DRX inactivity timer is started
C: The on duration timer expires, and because the DRX inactivity timer is running, the terminal device does not enter a sleep state and remains in an active state
D: The PDCCH indication for initial data transmission is received, and the DRX inactivity timer is restarted
E: The DRX inactivity timer expires, and the terminal device enters the sleep state

FIG. 5

COMMUNICATION METHOD AND APPARATUS

CROSS-REFERENCE TO RELATED APPLICATIONS

This application is a continuation of International Patent Application No. PCT/CN2020/081456, filed on Mar. 26, 2020, which claims priority to Chinese Patent Application No. 201910245772.4 filed on Mar. 28, 2019. The disclosures of the aforementioned applications are hereby incorporated by reference in their entireties.

TECHNICAL FIELD

This application relates to the communication field, and more specifically, to a communication method and apparatus.

BACKGROUND

A packet-based data stream is usually bursty. Data is transmitted in a period of time, but no data is transmitted in a next relatively long period of time. When no data is transmitted, power consumption may be reduced by stopping monitoring a physical downlink control channel (PDCCH) (in this case, blind detection of the PDCCH is stopped), to prolong battery use time of a terminal device. This is an origin of a discontinuous reception (DRX) mechanism.

After a DRX cycle is configured for a terminal device, in each DRX cycle, the terminal device periodically wakes up for a period of time to monitor data. A period of time in which a terminal device periodically wakes up in a DRX cycle is referred to as on duration. An on duration timer is started at the beginning of each DRX cycle.

A DRX inactivity timer is started (or restarted) when the terminal device successfully demodulates a PDCCH that is for initial data transmission and that is of the terminal device in the on duration. When the on duration timer expires, if the DRX inactivity timer is running, the terminal device does not enter a sleep state, and continues to remain in an active state. When the DRX inactivity timer expires, the terminal device enters the sleep state, and prepares to enter a next DRX cycle.

There are two types of DRX cycles: a DRX long cycle and a DRX short cycle.

In a current technology, when the DRX inactivity timer expires, if a DRX short cycle is configured for the terminal device, the terminal device always enters a DRX short cycle. This causes power consumption to some extent.

SUMMARY

This application provides a communication method and apparatus. When a DRX inactivity timer expires, a terminal device can more flexibly determine a type of a next DRX cycle. Further, the determined next DRX cycle is not necessarily a DRX short cycle. This saves power of the terminal device to some extent.

According to a first aspect, a communication method is provided. The method may be performed by a terminal device, or may be performed by a chip or a circuit disposed in the terminal device. The method includes: receiving data in an active time of a current DRX cycle; when a DRX inactivity timer of the current DRX cycle expires, determining a type of a next DRX cycle depending on whether at least some data received in the active time is associated with a DRX short cycle, where if the at least some data is not associated with a DRX short cycle, the next DRX cycle is a DRX long cycle, or the type of the next DRX cycle is the same as that of a DRX cycle previous to the current DRX cycle.

The active time is a time period between a start moment of an on duration and a moment at which a DRX inactivity timer expires in one DRX cycle. In other words, the active time is a time period in which the terminal device is in a state of monitoring a PDCCH in one DRX cycle.

Receiving the data in the active time includes that the terminal device successfully demodulates a PDCCH that is for initial data transmission and that is of the terminal device in the active time. The DRX inactivity timer is started or restarted when the PDCCH that is for initial data transmission and that is of the terminal device is demodulated in the active time.

"Before a DRX inactivity timer expires" refers to before the last started or restarted DRX inactivity timer expires in the current DRX cycle.

The data that is not associated with a DRX short cycle includes data that is associated with a DRX long cycle, and/or data that is neither associated with a DRX short cycle nor associated with a DRX long cycle.

In the solutions provided in this application, if the at least some data received in the active time is not associated with a DRX short cycle, it is determined that the next DRX cycle is a DRX long cycle. For another example, if the at least some data received in the active time is not associated with a DRX short cycle, and the DRX cycle previous to the current DRX cycle is a DRX long cycle (or a DRX short cycle), it is determined that the next DRX cycle is a DRX long cycle (or a DRX short cycle).

In the solutions provided in this application, when the DRX inactivity timer expires, even if a DRX short cycle is configured for the terminal device, the next DRX cycle is not necessarily a DRX short cycle. When the at least some data received in the current DRX cycle is not associated with a DRX short cycle, it is determined that the next DRX cycle is a DRX long cycle, or the type of the next DRX cycle is determined based on a type of the previous DRX cycle. Therefore, compared with a current technology, in this application, the terminal device can more flexibly determine the type of the next DRX cycle.

In addition, the DRX cycle previous to the current DRX cycle is not necessarily a DRX short cycle. Therefore, in this application, when the DRX inactivity timer expires, the terminal device does not always enter a DRX short cycle. Compared with the current technology, this can effectively save power of the terminal device to some extent.

With reference to the first aspect, in a possible implementation of the first aspect, if at least one piece of data in the at least some data is associated with a DRX short cycle, the next DRX cycle is a DRX short cycle.

In the solutions provided in this application, when the DRX inactivity timer expires, even if a DRX short cycle is configured for the terminal device, the next DRX cycle is not necessarily a DRX short cycle. When the data received in the current DRX cycle is associated with a DRX short cycle, the terminal device enters a DRX short cycle. Otherwise, the terminal device enters a DRX long cycle. Alternatively, the type of the next DRX cycle is determined based on the type of the previous DRX cycle. Compared with the current technology in which when the DRX inactivity timer expires, the terminal device always enters a DRX short cycle, the solution provided in this application can effectively save the power of the terminal device.

With reference to the first aspect, in a possible implementation of the first aspect, the at least some data received in the active time may be data received in any time period before the DRX inactivity timer expires in the current DRX cycle.

For example, the at least some data includes data received in any one of the following time periods:

T1: a time period between a start moment of an on duration of the current DRX cycle and a moment at which the DRX inactivity timer expires;

T2: a time period between a moment at which a physical downlink control channel PDCCH that is for initial data transmission and that is of the terminal device is successfully demodulated for the first time in the active time and the moment at which the DRX inactivity timer expires, where T2 may also be expressed as a time period between a time point at which the DRX inactivity timer is started for the first time and the moment at which the DRX inactivity timer expires in the current DRX cycle;

T3: a time period between a moment at which the PDCCH that is for initial data transmission and that is of the terminal device is successfully demodulated for the last time in the active time and the moment at which the DRX inactivity timer expires; and T4: a time period between the moment at which the DRX inactivity timer expires and a time point that is between the start moment of the on duration and the moment at which the DRX inactivity timer expires, where the time period between the time point and the moment at which the DRX inactivity timer expires is preset duration. The preset duration may be set according to an actual requirement or specified in a protocol.

In actual application, data received in any one of T1 to T4 may be selected according to a requirement to determine whether the data is associated with a DRX short cycle (or a DRX long cycle).

In the foregoing implementations, a plurality of manners may be used to determine whether the at least some data received in the active time is associated with a DRX short cycle or a DRX long cycle.

With reference to the first aspect, in a possible implementation of the first aspect, the terminal device determines, by determining whether a service corresponding to the at least some data is a delay-sensitive service, whether the at least some data is associated with a DRX short cycle or a DRX long cycle.

For example, the terminal device determines, by determining that the service corresponding to the at least some data is a delay-sensitive service, that the at least some data is associated with a DRX short cycle. The terminal device determines, by determining that the service corresponding to the at least some data is a delay-insensitive service, that the at least some data is not associated with a DRX short cycle.

In this implementation, the method further includes: sending, by the terminal device to a network device, indication information used to indicate that the at least some data is associated with or not associated with a DRX short cycle. For example, the indication information is carried by using radio resource control (RRC) signaling.

With reference to the first aspect, in a possible implementation of the first aspect, the terminal device determines, by determining whether a data bearing medium on which the at least some data is carried is associated with a DRX short cycle or a DRX long cycle, whether the at least some data is associated with a DRX short cycle or a DRX long cycle.

The data bearing medium is any one of the following: a logical channel (LCH), a logical channel group (LCG), a combination of the logical channel and the logical channel group, a data radio bearer (DRB), a quality of service flow (QoS Flow), and a protocol data unit session (PDU Session).

With reference to the first aspect, in a possible implementation of the first aspect, the method further includes: receiving configuration information of at least one data bearing medium from the network device, where the configuration information is used to indicate that the at least one data bearing medium is associated with a DRX short cycle or a DRX long cycle, and the at least some data includes data carried on the at least one data bearing medium.

With reference to the first aspect, in a possible implementation of the first aspect, when the configuration information includes first identification information, it indicates the at least one data bearing medium is associated with a DRX short cycle; or when the configuration information includes second identification information, it indicates the at least one data bearing medium is associated with a DRX long cycle.

With reference to the first aspect, in a possible implementation of the first aspect, when the configuration information includes third identification information, it indicates the at least one data bearing medium is associated with a DRX short cycle; and when the configuration information does not include the third identification information, it indicates the at least one data bearing medium is associated with a DRX long cycle; or when the configuration information includes fourth identification information, it indicates the at least one data bearing medium is associated with a DRX long cycle; and when the configuration information does not include the fourth identification information, it indicates the at least one data bearing medium is associated with a DRX short cycle.

In the technical solutions provided in this application, when the data bearing medium on which the received data is carried is not associated with a DRX short cycle, the terminal device determines that the next DRX cycle is a DRX long cycle, or the type of the next DRX cycle is the same as that of the DRX cycle previous to the current DRX cycle; when the data bearing medium on which the received data is carried is associated with a DRX short cycle, the terminal device determines that the next DRX cycle is a DRX short cycle. Therefore, in this application, when the DRX inactivity timer expires, the terminal device can more flexibly determine the type of the next DRX cycle. In addition, because the next DRX cycle is not always necessarily a DRX short cycle, the power can be saved.

Based on the foregoing descriptions, in the solutions provided in this application, when the DRX inactivity timer expires, even if a DRX short cycle is configured for the terminal device, the next DRX cycle is not necessarily a DRX short cycle. When the at least some data received in the current DRX cycle is not associated with a DRX short cycle, it is determined that the next DRX cycle is a DRX long cycle, or the type of the next DRX cycle is determined based on the type of the previous DRX cycle. Compared with the current technology in which when the DRX inactivity timer expires, the terminal device always enters a DRX short cycle, the solution provided in this application can effectively save the power of the terminal device.

According to a second aspect, a communication method is provided. The method may be performed by a network device, or may be performed by a chip or a circuit disposed in the network device. The method includes: determining configuration information of a data bearing medium, where the configuration information is used to indicate that the data bearing medium is associated with a DRX short cycle or a DRX long cycle; and sending the configuration information to a terminal device.

The data bearing medium is any one of the following: a logical channel (LCH), a logical channel group (LCG), a combination of the logical channel and the logical channel group, a data radio bearer (DRB), a quality of service flow (QoS Flow), and a protocol data unit session (PDU Session).

Optionally, the network device configures all data bearing mediums between the network device and the terminal device, configures some of the data bearing mediums to be associated with a DRX long cycle, and configures the remaining part of the data bearing mediums to be associated with a DRX short cycle.

Optionally, the network device configures some data bearing mediums between the network device and the terminal device.

The network device configures all of the some data bearing mediums to be associated with a DRX short cycle;

the network device configures all of the some data bearing mediums to be associated with a DRX long cycle; or the network device configures a part of the some data bearing mediums to be associated with a DRX short cycle, and configures the remaining part of the some data bearing mediums to be associated with a DRX long cycle.

For example, the network device configures only some data bearing mediums that need to carry a delay-sensitive service to be associated with a DRX short cycle, and does not configure the other data bearing mediums, that is, does not configure the other data bearing mediums to be associated with a DRX short cycle (or a DRX long cycle).

Optionally, when the configuration information includes first identification information, it indicates at least one data bearing medium is associated with a DRX short cycle; or when the configuration information includes second identification information, it indicates at least one data bearing medium is associated with a DRX long cycle.

When the configuration information includes third identification information, it indicates the at least one data bearing medium is associated with a DRX short cycle; and when the configuration information does not include the third identification information, it indicates the at least one data bearing medium is associated with a DRX long cycle; or when the configuration information includes fourth identification information, it indicates the at least one data bearing medium is associated with a DRX long cycle; and when the configuration information does not include the fourth identification information, it indicates the at least one data bearing medium is associated with a DRX short cycle.

For example, the network device may send the configuration information of the data bearing medium to the terminal device by using radio resource control (RRC) signaling.

With reference to the second aspect, in a possible implementation of the second aspect, the method further includes: when data to be sent to the terminal device corresponds to a delay-insensitive service, sending the data to the terminal device by using a first data bearing medium, where the first data bearing medium is not associated with a DRX short cycle.

The first data bearing medium is associated with a DRX long cycle. Alternatively, the first data bearing medium is neither associated with a DRX long cycle nor associated with a DRX short cycle.

With reference to the second aspect, in a possible implementation of the second aspect, the method further includes: when the data to be sent to the terminal device corresponds to a delay-sensitive service, sending the data to the terminal device by using a second data bearing medium, where the second data bearing medium is associated with a DRX short cycle.

Based on the foregoing solution, the network device sends the data corresponding to the delay-sensitive service to the terminal device by using a data bearing medium associated with a DRX short cycle, and sends the data corresponding to the delay-insensitive service to the terminal device by using a data bearing medium not associated with a DRX short cycle. When the data bearing medium on which the received data is carried is not associated with a DRX short cycle, the terminal device determines that a next DRX cycle is a DRX long cycle, or a type of a next DRX cycle is the same as that of a DRX cycle previous to a current DRX cycle. When the data bearing medium on which the received data is carried is associated with a DRX short cycle, the terminal device determines that a next DRX cycle is a DRX short cycle. Therefore, in this embodiment of this application, when a DRX inactivity timer expires, the terminal device does not always enter a DRX short cycle. In this way, power can be saved. In addition, for the delay-sensitive service, when the DRX inactivity timer expires, the terminal device enters a DRX short cycle. In this way, a delay requirement of the delay-sensitive service can be satisfied. Therefore, in this embodiment of this application, both a power saving requirement and the delay requirement of the delay-sensitive service can be better satisfied.

According to a third aspect, a communication apparatus is provided. The communication apparatus includes a transceiver unit and a processing unit. The transceiver unit is configured to receive data in an active time of a current DRX cycle. The processing unit is configured to: when a DRX inactivity timer of the current DRX cycle expires, determine a type of a next DRX cycle depending on whether at least some data received in the active time is associated with a DRX short cycle, where if the at least some data received in the active time is not associated with a DRX short cycle, the next DRX cycle is a DRX long cycle, or the type of the next DRX cycle is the same as that of a DRX cycle previous to the current DRX cycle.

The communication apparatus may be configured on or may be a terminal device.

With reference to the third aspect, in a possible implementation of the third aspect, if at least one piece of data in the at least some data is associated with a DRX short cycle, the next DRX cycle is a DRX short cycle.

With reference to the third aspect, in a possible implementation of the third aspect, the at least some data received in the active time may be data received in any time period before the DRX inactivity timer expires in the current DRX cycle.

For example, the at least some data includes data received in any one of the following time periods:

T1: a time period between a start moment of an on duration of the current DRX cycle and a moment at which the DRX inactivity timer expires;

T2: a time period between a moment at which a physical downlink control channel PDCCH that is for initial data transmission and that is of the terminal device is successfully demodulated for the first time in the active time and the moment at which the DRX inactivity timer expires, where T2 may also be expressed as a time period between a time point at which the DRX inactivity timer is started for the first time and the moment at which the DRX inactivity timer expires in the current DRX cycle;

T3: a time period between a moment at which the PDCCH that is for initial data transmission and that is of the terminal device is successfully demodulated for the last time in the active time and the moment at which the DRX inactivity timer expires; and T4: a time period between the moment at which the DRX inactivity timer expires and a time point that is between the start moment of the on duration and the moment at which the DRX inactivity timer expires, where the time period between the time point and the moment at which the DRX inactivity timer expires is preset duration. The preset duration may be set according to an actual requirement or specified in a protocol.

In actual application, data received in any one of T1 to T4 may be selected according to a requirement to determine whether the data is associated with a DRX short cycle (or a DRX long cycle).

With reference to the third aspect, in a possible implementation of the third aspect, the transceiver unit is further configured to receive configuration information of at least one data bearing medium from a network device, where the configuration information is used to indicate that the at least one data bearing medium is associated with a DRX short cycle or a DRX long cycle, and the at least some data includes data carried on the at least one data bearing medium.

With reference to the third aspect, in a possible implementation of the third aspect, when the configuration information includes first identification information, it indicates the at least one data bearing medium is associated with a DRX short cycle; or when the configuration information includes second identification information, it indicates the at least one data bearing medium is associated with a DRX long cycle.

With reference to the third aspect, in a possible implementation of the third aspect, when the configuration information includes third identification information, it indicates the at least one data bearing medium is associated with a DRX short cycle; and when the configuration information does not include the third identification information, it indicates the at least one data bearing medium is associated with a DRX long cycle; or when the configuration information includes fourth identification information, it indicates the at least one data bearing medium is associated with a DRX long cycle; and when the configuration information does not include the fourth identification information, it indicates the at least one data bearing medium is associated with a DRX short cycle.

With reference to the third aspect, in a possible implementation of the third aspect, the at least one data bearing medium is any one of the following: a logical channel (LCH), a logical channel group (LCG), a combination of the logical channel and the logical channel group, a data radio bearer (DRB), a quality of service flow (QoS flow), and a protocol data unit session (PDU Session).

With reference to the third aspect, in a possible implementation of the third aspect, the data that is not associated with a DRX short cycle includes any one or more of the following: data that is associated with a DRX long cycle, and data that is neither associated with a DRX long cycle nor associated with a DRX short cycle.

Units in the communication apparatus are separately configured to perform the steps of the method in the first aspect and the implementations of the first aspect.

Optionally, the communication apparatus is a communication chip. The communication chip may include an input circuit or interface configured to send information or data, and an output circuit or interface configured to receive information or data.

Optionally, the communication apparatus is a communication device. The communication device may include a transmitter configured to send information or data, and a receiver configured to receive information or data.

According to a fourth aspect, a communication apparatus is provided. The communication apparatus includes a transceiver unit and a processing unit. The processing unit is configured to determine configuration information of a data bearing medium, where the configuration information is used to indicate that the data bearing medium is associated with a DRX short cycle or a DRX long cycle. The transceiver unit is configured to send the configuration information to a terminal device.

The communication apparatus may be configured on or may be a network device.

With reference to the fourth aspect, in a possible implementation of the fourth aspect, when the configuration information includes first identification information, it indicates the data bearing medium is associated with a DRX short cycle; or when the configuration information includes second identification information, it indicates the data bearing medium is associated with a DRX long cycle.

With reference to the fourth aspect, in a possible implementation of the fourth aspect, when the configuration information includes third identification information, it indicates the data bearing medium is associated with a DRX short cycle; and when the configuration information does not include the third identification information, it indicates the data bearing medium is associated with a DRX long cycle; or when the configuration information includes fourth identification information, it indicates the data bearing medium is associated with a DRX long cycle; and when the configuration information does not include the fourth identification information, it indicates the data bearing medium is associated with a DRX short cycle.

With reference to the fourth aspect, in a possible implementation of the fourth aspect, the transceiver unit is further configured to: when data to be sent to the terminal device corresponds to a delay-insensitive service, send the data to the terminal device by using a first data bearing medium, where the first data bearing medium is not associated with a DRX short cycle.

With reference to the fourth aspect, in a possible implementation of the fourth aspect, the transceiver unit is further configured to: when the data to be sent to the terminal device corresponds to a delay-sensitive service, send the data to the terminal device by using a second data bearing medium, where the second data bearing medium is associated with a DRX short cycle.

With reference to the fourth aspect, in a possible implementation of the fourth aspect, the first data bearing medium is associated with a DRX long cycle; or the first data bearing medium is neither associated with a DRX long cycle nor associated with a DRX short cycle.

With reference to the fourth aspect, in a possible implementation of the fourth aspect, the data bearing medium is any one of the following: a logical channel (LCH), a logical channel group (LCG), a combination of the logical channel and the logical channel group, a data radio bearer (DRB), a quality of service flow (QoS flow), and a protocol data unit session (PDU Session).

Units in the communication apparatus are separately configured to perform the steps of the method in the second aspect and the implementations of the second aspect.

Optionally, the communication apparatus is a communication chip. The communication chip may include an input circuit or interface configured to send information or data, and an output circuit or interface configured to receive information or data.

Optionally, the communication apparatus is a communication device. The communication device may include a transmitter configured to send information or data, and a receiver configured to receive information or data.

According to a fifth aspect, a communication apparatus is provided. The communication apparatus includes a processor and a memory. The memory is configured to store a computer program. The processor is configured to invoke the computer program from the memory and run the computer program, so that the communication apparatus performs the method in the first aspect, the second aspect, or the possible implementations of the first aspect and the second aspect.

Optionally, there are one or more processors, and there are one or more memories.

Optionally, the memory may be integrated with the processor, or the memory and the processor are separately disposed.

Optionally, the communication apparatus further includes a transmitter machine (transmitter) and a receiver machine (receiver).

According to a sixth aspect, a communication system is provided. The communication system includes the communication apparatus provided in the third aspect and/or the communication apparatus provided in the fourth aspect.

According to a seventh aspect, a computer program product is provided. The computer program product includes a computer program (which may also be referred to as code or instructions). When the computer program is run, a computer is enabled to perform the method in any one of the possible implementations of the first aspect or the second aspect.

According to an eighth aspect, a computer-readable medium is provided. The computer-readable medium stores a computer program (which may also be referred to as code or instructions). When the computer program is run, a computer is enabled to perform the method in any one of the possible implementations of the first aspect or the second aspect.

According to a ninth aspect, a chip system is provided. The chip system includes a memory and a processor. The memory is configured to store a computer program. The processor is configured to invoke the computer program from the memory and run the computer program, so that a communication apparatus on which the chip system is installed performs the method in any one of the possible implementations of the first aspect or the second aspect.

The chip system may include an input circuit or interface configured to send information or data, and an output circuit or interface configured to receive information or data.

Therefore, in the solutions provided in this application, when the DRX inactivity timer expires, even if a DRX short cycle is configured for the terminal device, the next DRX cycle is not necessarily a DRX short cycle. When the at least some data received in the current DRX cycle is not associated with a DRX short cycle, it is determined that the next DRX cycle is a DRX long cycle, or the type of the next DRX cycle is determined based on the type of the previous DRX cycle. Compared with the current technology, in this application, the terminal device can more flexibly determine the type of the next DRX cycle. In addition, the DRX cycle previous to the current DRX cycle is not necessarily a DRX short cycle. Therefore, in this application, when the DRX inactivity timer expires, the terminal device does not always enter a DRX short cycle. Compared with the current technology, this can effectively save the power of the terminal device to some extent.

BRIEF DESCRIPTION OF DRAWINGS

FIG. 2 is a schematic diagram of starting (or restarting) and expiration of a DRX inactivity timer in a DRX mechanism;

FIG. 3 is a schematic diagram showing that a terminal device enters a DRX short cycle when a DRX inactivity timer expires in a current technology;

FIG. 4 is a schematic flowchart of a communication method according to an embodiment of this application;

FIG. 5 is a schematic diagram of time periods in which at least some data is received in a current DRX cycle according to an embodiment of this application;

DESCRIPTION OF EMBODIMENTS

The following describes technical solutions of this application with reference to the accompanying drawings.

Unless otherwise defined, all technical and scientific terms used herein have the same meaning as commonly understood by a person skilled in the art to which this application pertains. The terms used in the specification of this application are merely for the purpose of describing specific embodiments, and are not intended to limit this application.

To better understand the technical solutions provided in this application, the following first describes several concepts related to the embodiments of this application.

1. Discontinuous Reception (DRX) Cycle, DRX Long Cycle, and DRX Short Cycle

Figure 1:
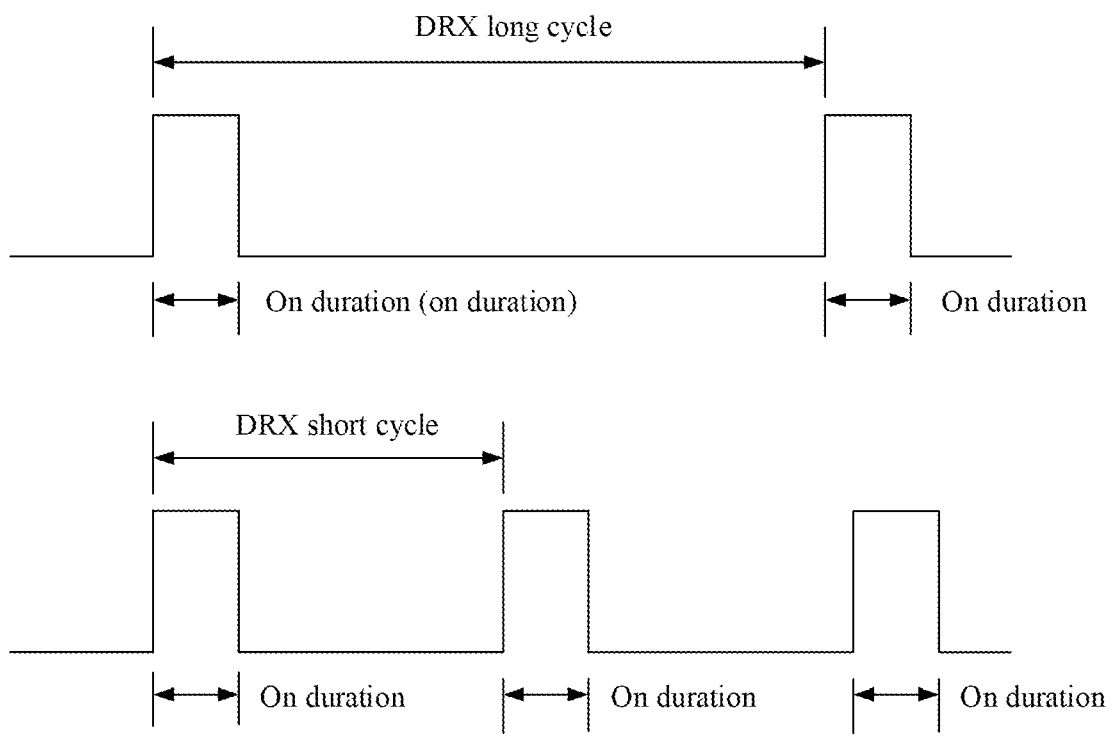
FIG. 1 is a schematic diagram of a DRX cycle.

As shown in FIG. 1, each DRX cycle includes an on duration and a sleep period. Duration of the on duration is determined by an on duration timer. At a start moment of each DRX cycle, the on duration timer is started, and a terminal device enters an active state and monitors data. When the on duration timer expires, and no DRX inactivity timer (described below) is running currently, the terminal device enters a sleep state, and no longer monitors data. When a next DRX cycle arrives, the terminal device re-enters the active state.

There are two types of DRX cycles: a DRX long cycle (a DRX cycle shown in an upper part of FIG. 1) and a DRX short cycle (a DRX cycle shown in a lower part of FIG. 1). Generally, the DRX long cycle is applicable to a delay-insensitive service, and the DRX short cycle is applicable to a delay-sensitive service.

2. DRX Inactivity Timer

The DRX inactivity timer is an important concept in a DRX mechanism.

During a running period of the DRX inactivity timer, the terminal device monitors a PDCCH. The DRX inactivity timer is started or restarted when the terminal device successfully demodulates a PDCCH that is for initial data transmission and that is of the terminal device.

In a DRX cycle shown in an upper part of FIG. 2, if the terminal device does not receive data in an on duration, for example, does not demodulate the PDCCH that is for initial data transmission and that is of the terminal device, the terminal device enters a sleep period after the on duration ends (that is, an on duration timer expires).

In a DRX cycle shown in a lower part of FIG. 2, if the terminal device receives data in an on duration, the terminal device does not necessarily enter the sleep period after the on duration ends, but enters the sleep period after the DRX inactivity timer expires. Details are as follows:

A moment indicated by A indicates a start moment of a current DRX cycle. At this moment, the on duration timer is started. The terminal device keeps monitoring data (that is, remains in an active state) in a time period (that is, in the on duration) before the on duration timer expires.

A moment indicated by B indicates a moment at which the terminal device successfully demodulates the PDCCH of the terminal device for the first time, and may also be referred to as a moment at which a PDCCH indication for initial data transmission is received for the first time. At this moment, the DRX inactivity timer is started. Before the DRX inactivity timer expires, the terminal device remains in the active state and monitors data.

A moment indicated by C indicates a moment at which the on duration timer expires (that is, the on duration ends). At this moment, because the DRX inactivity timer is still running, the terminal device does not enter the sleep state, but continues to remain in the active state, and continues to monitor data.

A moment indicated by D indicates a moment at which the terminal device successfully demodulates the PDCCH of the terminal device again before the DRX inactivity timer started at the moment indicated by B expires, and may alternatively be described as a moment at which the PDCCH indication for initial data transmission is received again. At this moment, the DRX inactivity timer is restarted (it may be considered that the DRX inactivity timer started at the moment indicated by B is reset). Before the DRX inactivity timer expires, the terminal device remains in the active state and monitors data.

A moment indicated by E indicates a moment at which the DRX inactivity timer started at the moment indicated by D expires. At this moment, the terminal device enters the sleep state, and no longer monitors data.

A time period in which the terminal device is in a state of monitoring a PDCCH in one DRX cycle may be collectively referred to as an active time.

According to an existing DRX mechanism, after the DRX inactivity timer expires, if a DRX short cycle is configured for the terminal device, a next DRX cycle that the terminal device is to enter is a DRX short cycle. As shown in FIG. 3, at a moment indicated by E, the DRX inactivity timer expires, the terminal device enters the sleep state, and a next DRX cycle that the terminal device is to enter is a DRX short cycle.

In actual application, a delay-sensitive service and a delay-insensitive service both exist. The delay-sensitive service may be a service that has a relatively high delay requirement, for example, some emergency services. The delay-insensitive service may be a service that has a relatively low delay requirement, for example, some non-emergency services.

The delay-insensitive service has a relatively low requirement on a data transmission delay. For example, when the terminal device monitors data by using a DRX long cycle, a delay requirement of the delay-insensitive service may also be satisfied.

According to the existing DRX mechanism, after the DRX inactivity timer expires, if a DRX short cycle is configured for the terminal device, the terminal device always enters a DRX short cycle. This is unnecessary for the delay-insensitive service. In other words, this causes unnecessary power consumption.

To address the foregoing problem, this application proposes a solution for determining a DRX cycle. When the DRX inactivity timer expires, the terminal device can more flexibly determine a type of the next DRX cycle. Further, the determined next DRX cycle is not necessarily a DRX short cycle. This saves power of the terminal device to some extent.

It should be noted that FIG. 1 to FIG. 3 are merely examples rather than limitations. For example, in FIG. 2 and FIG. 3, before the DRX inactivity timer expires, a quantity of times that the terminal device receives the PDCCH indication is determined based on a specific situation, and is not limited. For another example, in the DRX mechanism, there are other concepts, for example, a HARQ round trip time timer (HARQ RTT Timer) and a DRX retransmission timer. These concepts also affect whether a terminal device is in an active state or in a sleep state. Because the embodiments of this application are not directly related to these concepts, details are not described in this specification, and certainly there is no limitation.

The technical solutions in the embodiments of this application may be applied to various communication systems, for example, a long term evolution (LTE) system, a fifth generation (5G) mobile communication system, a new radio (NR) system, a machine-to-machine (M2M) communication system, another future evolved communication system, or the like.

The terminal device in the embodiments of this application may be user equipment (UE), an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future evolved public land mobile network (PLMN), or the like. This is not limited in the embodiments of this application.

The network device in the embodiments of this application may be a device configured to communicate with the terminal device, or may be any device with a wireless transceiver function, or a chip that may be disposed in the terminal device. The network device may be a base station. The base station may be configured to communicate with one or more terminal devices, or may be configured to communicate with one or more base stations having some functions of the terminal device (for example, communication between a macro base station and a micro base station). The network device may be a base station in an LTE system, a 5G system, an NR system, an M2M system, or another future evolved communication system. In addition, the network device may alternatively be an access point (AP), a transmission node (TRP), a central unit (CU), or another network entity, and may include some or all of functions of the foregoing network entities. This is not limited in the embodiments of this application.

FIG. 4 is a schematic flowchart of a communication method 400 according to an embodiment of this application. The method 400 may be performed by a terminal device, or may be performed by a chip or a circuit disposed in the terminal device. The method 400 includes the following steps.

S410: Receive data in an active time of a current DRX cycle.

The active time is a time period between a start moment of an on duration and a moment at which a DRX inactivity timer expires in one DRX cycle. In other words, the active time is a time period in which the terminal device is in a state of monitoring a PDCCH in one DRX cycle.

It should be understood that the terminal device monitors the PDCCH only in the active time, and may temporarily disable a receiver in a sleep period, to reduce power consumption.

Receiving the data in the active time includes that the terminal device successfully demodulates a PDCCH that is for initial data transmission and that is of the terminal device in the active time. The DRX inactivity timer is started or restarted when the PDCCH that is for initial data transmission and that is of the terminal device is demodulated in the active time.

S420: When the DRX inactivity timer of the current DRX cycle expires, determine a type of a next DRX cycle depending on whether at least some data received in the active time is associated with a DRX short cycle.

If the at least some data received in the active time is not associated with a DRX short cycle, the next DRX cycle is a DRX long cycle, or the type of the next DRX cycle is the same as that of a DRX cycle previous to the current DRX cycle.

For example, if the at least some data received in the active time is not associated with a DRX short cycle, it is determined that the next DRX cycle is a DRX long cycle. For another example, if the at least some data received in the active time is not associated with a DRX short cycle, and the DRX cycle previous to the current DRX cycle is a DRX long cycle (or a DRX short cycle), it is determined that the next DRX cycle is a DRX long cycle (or a DRX short cycle).

If at least one piece of data in the at least some data is associated with a DRX short cycle, the next DRX cycle is a DRX short cycle.

"Before a DRX inactivity timer expires" in this embodiment of this application refers to before the last started DRX inactivity timer expires in the current DRX cycle. For example, in FIG. 3, "before a DRX inactivity timer expires" refers to before the moment indicated by E.

The data that is not associated with a DRX short cycle in this embodiment of this application includes data that is associated with a DRX long cycle, and/or data that is neither associated with a DRX short cycle nor associated with a DRX long cycle.

Whether the data is associated with a DRX short cycle (or a DRX long cycle) may be determined based on a service attribute corresponding to the data, or whether the data is associated with a DRX short cycle (or a DRX long cycle) may be determined based on a data bearing medium on which the data is carried. This will be described below.

Therefore, in the solutions provided in this application, when the DRX inactivity timer expires, even if a DRX short cycle is configured for the terminal device, the next DRX cycle is not necessarily a DRX short cycle. When the at least some data received in the current DRX cycle is not associated with a DRX short cycle, it is determined that the next DRX cycle is a DRX long cycle, or the type of the next DRX cycle is determined based on the type of the previous DRX cycle. Compared with a current technology, the solutions in this application provide more flexible manners for determining the type of the next DRX cycle.

In addition, the DRX cycle previous to the current DRX cycle is not necessarily a DRX short cycle. Therefore, in this application, when the DRX inactivity timer expires, the terminal device does not always enter a DRX short cycle. Compared with the current technology, this can effectively save power of the terminal device to some extent.

In this embodiment of this application, the at least some data received in the active time may be data received in any time period before the DRX inactivity timer expires in the current DRX cycle.

Optionally, in some embodiments, the at least some data includes data received in any one of the following time periods:

T1: a time period between a start moment of an on duration of the current DRX cycle and a moment at which the DRX inactivity timer expires, where T1 is a time period ① shown in FIG. 5;

T2: a time period between a moment at which a physical downlink control channel PDCCH that is for initial data transmission and that is of the terminal device is successfully demodulated for the first time in the active time and the moment at which the DRX inactivity timer expires, where T2 is a time period ② shown in FIG. 5, and T2 may also be expressed as a time period between a time point at which the DRX inactivity timer is started for the first time and the moment at which the DRX inactivity timer expires in the current DRX cycle;

T3: a time period between a moment at which the PDCCH that is for initial data transmission and that is of the terminal device is successfully demodulated for the last time in the active time and the moment at which the DRX inactivity timer expires, where T3 is a time period ③ shown in FIG. 5; and T4: a time period between the moment at which the DRX inactivity timer expires and a time point that is between the start moment of the on duration and the moment at which the DRX inactivity timer expires, where the time period between the time point and the moment at which the DRX inactivity timer expires is preset duration, and T4 is a time period ④ shown in FIG. 5. The preset duration may be set according to an actual requirement or specified in a protocol.

In actual application, data in any one of T1 to T4 may be selected according to a requirement to determine whether the data is associated with a DRX short cycle (or a DRX long cycle).

A plurality of manners may be used to determine whether the at least some data received in the active time is associated with a DRX short cycle or a DRX long cycle.

Optionally, in an implementation, the terminal device determines, by determining whether a service corresponding to the at least some data is a delay-sensitive service, whether the at least some data is associated with a DRX short cycle or a DRX long cycle.

For example, the terminal device determines, by determining that a service corresponding to the at least some data is a delay-sensitive service, that the at least some data is associated with a DRX short cycle. The terminal device determines, by determining that a service corresponding to the at least some data is a delay-insensitive service, that the at least some data is not associated with a DRX short cycle.

In this implementation, the method 400 further includes: The terminal device sends, to a network device, indication information used to indicate that the at least some data is associated with or not associated with a DRX short cycle. For example, the indication information is carried by using radio resource control (RRC) signaling.

In this embodiment of this application, the delay-sensitive service indicates a service that has a relatively high delay requirement, and the delay-insensitive service indicates a service that has a low delay requirement.

Optionally, in another implementation, whether the at least some data is associated with a DRX short cycle or a DRX long cycle is determined by determining whether a data bearing medium on which the at least some data is carried is associated with a DRX short cycle or a DRX long cycle.

If the data bearing medium on which the at least some data is carried is associated with a DRX long cycle, or is neither associated with a DRX long cycle nor associated with a DRX short cycle, it is determined that the at least some data is not associated with a DRX short cycle.

If the data bearing medium on which the at least some data is carried is associated with a DRX short cycle, it is determined that the at least some data is associated with a DRX short cycle.

Optionally, in some embodiments, if the data bearing medium on which at least one piece of data in the at least some data is carried is associated with a DRX short cycle, it is determined that the next DRX cycle is a DRX short cycle.

Figure 6:
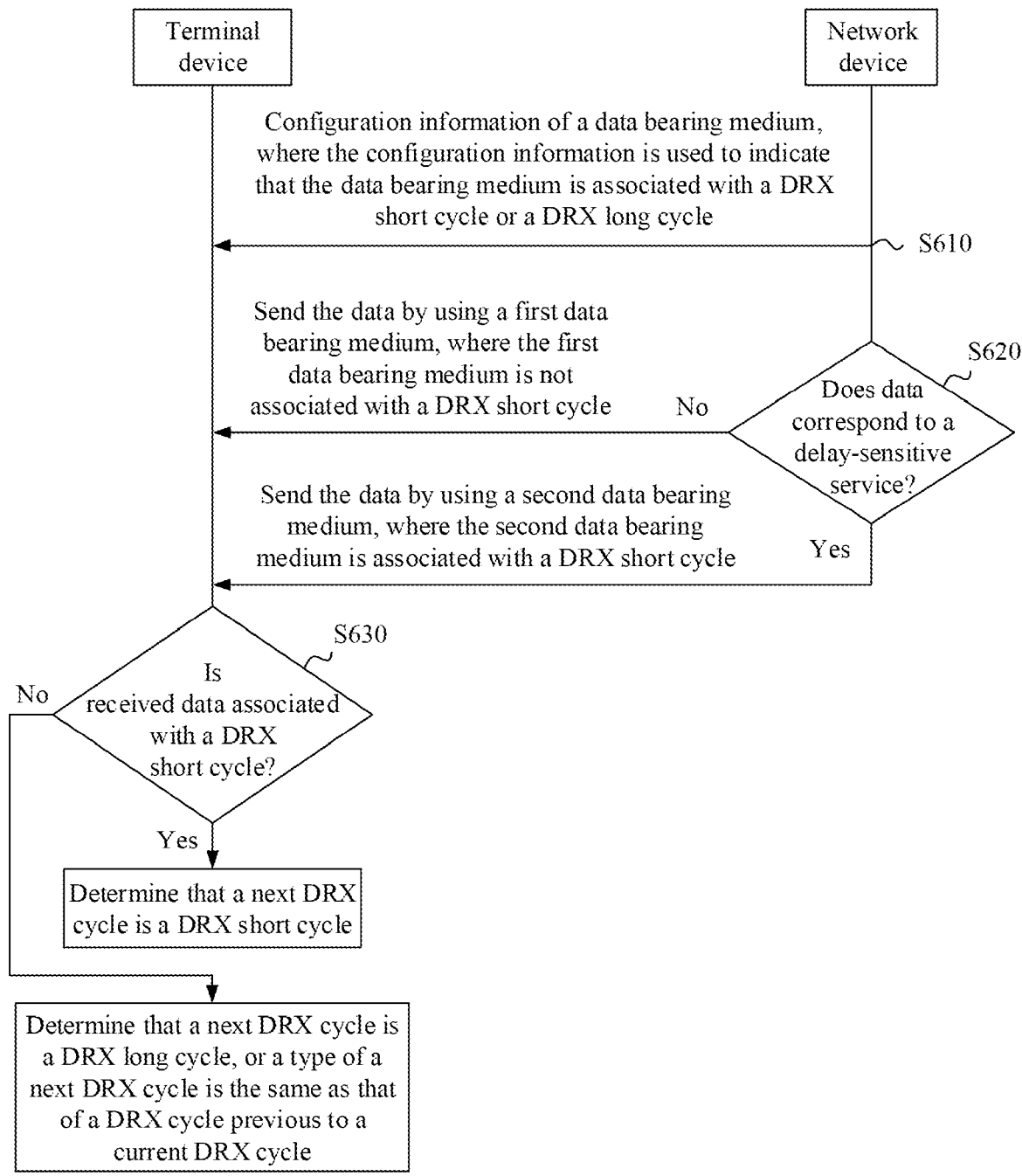
FIG. 6 is a schematic flowchart of a communication method according to another embodiment of this application.

FIG. 6 is a schematic interaction flowchart of a communication method 600 according to an embodiment of this application. The method 600 includes the following steps.

S610: A network device determines configuration information of a data bearing medium, and sends the configuration information to a terminal device, where the configuration information is used to indicate that the data bearing medium is associated with a DRX short cycle or a DRX long cycle.

There may be a plurality of data bearing mediums between the network device and the terminal device.

Optionally, in some embodiments, the network device configures all data bearing mediums between the network device and the terminal device, configures some of the data bearing mediums to be associated with a DRX long cycle, and configures the remaining part of the data bearing mediums to be associated with a DRX short cycle.

Optionally, in some embodiments, the network device configures some data bearing mediums between the network device and the terminal device.

The network device configures all of the some data bearing mediums to be associated with a DRX short cycle;

the network device configures all of the some data bearing mediums to be associated with a DRX long cycle; or the network device configures a part of the some data bearing mediums to be associated with a DRX short cycle, and configures the remaining part of the some data bearing mediums to be associated with a DRX long cycle.

For example, the network device configures only some data bearing mediums that need to carry a delay-sensitive service to be associated with a DRX short cycle, and does not configure the other data bearing mediums, that is, does not configure the other data bearing mediums to be associated with a DRX short cycle (or a DRX long cycle).

Optionally, when the configuration information includes first identification information, it indicates at least one data bearing medium is associated with a DRX short cycle; or when the configuration information includes second identification information, it indicates at least one data bearing medium is associated with a DRX long cycle.

One data bearing medium is used as an example. A field is set in configuration information of the data bearing medium. The field may have two values. One value indicates that the data bearing medium is associated with a DRX short cycle, and the other value indicates that the data bearing medium is associated with a DRX long cycle.

When the configuration information includes third identification information, it indicates the at least one data bearing medium is associated with a DRX short cycle; when the configuration information does not include the third identification information, it indicates the at least one data bearing medium is associated with a DRX long cycle; or when the configuration information includes fourth identification information, it indicates the at least one data bearing medium is associated with a DRX long cycle; when the configuration information does not include the fourth identification information, it indicates the at least one data bearing medium is associated with a DRX short cycle.

One data bearing medium is still used as an example. A field is set in configuration information of the data bearing medium. The field is optional. If the field exists, it indicates the data bearing medium is associated with a DRX short cycle (or a DRX long cycle). If the field does not exist, it indicates the data bearing medium is associated with a DRX long cycle (or a DRX short cycle).

For example, the network device may send the configuration information of the data bearing medium to the terminal device by using radio resource control (RRC) signaling.

In other words, the network device may configure an association relationship between the data bearing medium and a DRX short cycle or a DRX long cycle by using the RRC signaling.

S620: The network device determines whether data to be sent to the terminal device corresponds to a delay-sensitive service. If the data to be sent to the terminal device does not correspond to the delay-sensitive service, the data is sent to the terminal device by using a first data bearing medium. If the data to be sent to the terminal device corresponds to the delay-sensitive service, the data is sent to the terminal device by using a second data bearing medium.

The first data bearing medium is not associated with a DRX short cycle. For example, the first data bearing medium is configured to be associated with a DRX long cycle; or the first data bearing medium is neither configured to be associated with a DRX long cycle, nor configured to be associated with a DRX short cycle.

The second data bearing medium is configured to be associated with a DRX short cycle.

S630: The terminal device determines whether at least some data received in an active time of a current DRX cycle is associated with a DRX short cycle. If the at least some data received in the active time of the current DRX cycle is associated with a DRX short cycle, it is determined that a next DRX cycle is a DRX short cycle. If the at least some data received in the active time of the current DRX cycle is not associated with a DRX short cycle, it is determined that the next DRX cycle is a DRX long cycle; or when a DRX cycle previous to the current DRX cycle is a DRX long cycle (or a DRX short cycle), it is determined that the next DRX cycle is a DRX long cycle (or a DRX short cycle).

If all data bearing mediums on which the at least some data is carried are not associated with a DRX short cycle, for example, are associated with a DRX long cycle, or are neither associated with a DRX long cycle nor associated with a DRX short cycle, the terminal device determines that the at least some data is not associated with a DRX short cycle.

If the data bearing medium on which the at least some data is carried is associated with a DRX short cycle, the terminal device determines that the at least some data is associated with a DRX short cycle.

Optionally, in this embodiment, step S610 may not be performed.

For example, after configuring the data bearing medium once, the network device uses the configuration in a plurality of subsequent data transmission processes, and does not need to configure the data bearing medium during each data transmission.

In this embodiment, the network device sends the data corresponding to the delay-sensitive service to the terminal device by using a data bearing medium associated with a DRX short cycle, and sends the data corresponding to the delay-insensitive service to the terminal device by using a data bearing medium not associated with a DRX short cycle. When the data bearing medium on which the received data is carried is not associated with a DRX short cycle, the terminal device determines that the next DRX cycle is a DRX long cycle, or a type of the next DRX cycle is the same as that of the DRX cycle previous to the current DRX cycle. When the data bearing medium on which the received data is carried is associated with a DRX short cycle, the terminal device determines that the next DRX cycle is a DRX short cycle. Therefore, in this embodiment of this application, when a DRX inactivity timer expires, the terminal device does not always enter a DRX short cycle. In this way, power can be saved. In addition, for the delay-sensitive service, when the DRX inactivity timer expires, the terminal device enters a DRX short cycle. In this way, a delay requirement of the delay-sensitive service can be satisfied. Therefore, in this embodiment of this application, both a power saving requirement and the delay requirement of the delay-sensitive service can be better satisfied.

The data bearing medium in the embodiments of this application may be any one of the following: a logical channel (LCH), a logical channel group (LCG), a combination of the logical channel and the logical channel group, a data radio bearer (DRB), a quality of service flow (QoS Flow), and a protocol data unit session (PDU Session).

The logical channel may be classified into a logical control channel and a logical data channel The logical control channel is used to transmit control and configuration information, and the logical data channel is used to transmit user data.

For example, a logical channel in an NR system includes any one or more of the following: a broadcast control channel (BCCH), a paging control channel (PCCH), a common control channel (CCCH), a dedicated control channel (DCCH) and a dedicated traffic channel (DTCH).

A media access control (MAC) layer may provide a service to a radio link control (RLC) layer through the logical channel. From a perspective of a physical layer, the MAC layer uses the service in a form of a transport channel. The transport channel defines how information is transmitted over an air interface. Data on the transport channel is organized in a form of a transport block.

A transport format (TF) related to the transport block defines how a transport block is transmitted over an air interface. The TF may include the following related information: a transport block size, a modulation and coding scheme, and antenna mapping. Based on different TFs, the MAC layer can implement different data rates. This process is referred to as transport format selection.

The transport channel in the NR system may include any one or more of the following: a broadcast channel (BCH), a paging channel (PCH), a downlink shared channel (DL-SCH), an uplink shared channel (UL-SCH), and a random access channel (RACH).

One of functions of the MAC layer is to multiplex and map different logical channels onto an appropriate transport channel. To support priority processing, a plurality of logical channels (each of which has its own RLC entity) may be multiplexed onto one transport channel by the MAC layer. At a receive end, the MAC layer performs demultiplexing and forwards an RLC protocol data unit (PDU) to a corresponding RLC entity. To support demultiplexing at the receive end, a MAC header needs to be used. In the NR system, a subheader corresponding to each MAC service data unit (SDU) is placed in front of the SDU. The RLC PDU is actually the MAC SDU. The subheader contains a logical channel ID (LCID) and a length of the PDU (The subheader contains the identity of the logical channel (LCID) from which the RLC PDU originated and the length of the PDU in bytes). A flag is further included to indicate a length of a length indicator, and there is further a reserved bit for future use.

In addition to multiplexing different logical channels, the MAC layer may further add a MAC control element (MAC CE) to the transport block sent on the logical channel. The MAC CE is used for control signaling.

For example, there may be the following plurality of types of MAC CEs with respective different purposes.

(1) a scheduling-related MAC CE, such as a buffer status report and a power headroom report used to assist uplink scheduling, and a configured grant confirmation MAC CE used when semi-persistent scheduling is configured;

(2) a random access-related MAC CE, such as a C-RNTI and a contention-resolution MAC CE;

(3) a timing advance MAC CE;

(4) activation/deactivation of a carrier;

(5) a DRX-related MAC CE;

(6) a MAC CE related to PDCP duplicate detection; and (7) activation/deactivation of CSI reporting and SRS transmission.

The logical channel group (LCG) includes a plurality of logical channels, and a purpose is to send buffer status reports (BSR) of the plurality of logical channels together. In this way, signaling overheads are reduced. Otherwise, sending one BSR on each logical channel causes a large waste.

It should be understood that the LCID is different from an LCG ID. The LCID is used to uniquely specify a MAC SDU, a MAC control element, or a padding in a MAC PDU. The LCG ID is used to specify an ID of a logical channel group to which a logical channel belongs and is used only for BSR reporting.

Based on the foregoing descriptions, according to the technical solution provided in this application, when there is no delay-sensitive service, the terminal device can enter a DRX long cycle after the DRX inactivity timer expires, thereby saving power.

Optionally, in some of the foregoing embodiments, when the terminal device has a power saving requirement, the following manner is used to determine whether the next DRX cycle is a DRX short cycle or a DRX long cycle.

If the at least some data received in the active time is not associated with a DRX short cycle, it is determined that the next DRX cycle is a DRX long cycle, or it is determined that the type of the next DRX cycle is the same as that of the DRX cycle previous to the current DRX cycle.

If at least one piece of data in the at least some data is associated with a DRX short cycle, it is determined that the next DRX cycle is a DRX short cycle.

A scenario in which the terminal device has a power saving requirement is, for example, that the terminal device has a power saving tendency, or the terminal device works in a power saving mode.

The terminal device may indicate, by sending an indication to the network device, that the terminal device has a power saving tendency. For example, the indication is sent by using an RRC message.

The power saving mode of the terminal device may be specified in a protocol, or triggered by the terminal device indicating the network device, or triggered by the network device indicating the terminal device.

Optionally, in the embodiment shown in FIG. 6, the network device performs step S610 and step S620 when the terminal device has a power saving requirement.

For example, the network device learns that the terminal device has a power saving requirement, and performs step S610 and step S620. If the terminal device has no power saving requirement, the network device may not perform step S610 and step S620.

The embodiments described in this specification may be independent solutions, or may be combined based on internal logic. These solutions all fall within the protection scope of this application.

It may be understood that in the foregoing method embodiments, the methods and operations that are implemented by the terminal device may alternatively be implemented by a component (for example, a chip or a circuit) that may be used in the terminal device, and the methods and the operations that are implemented by the network device may alternatively be implemented by a component (for example, a chip or a circuit) that may be used in the network device.

The foregoing describes the method embodiments provided in the embodiments of this application, and the following describes apparatus embodiments provided in the embodiments of this application. It should be understood that descriptions of the apparatus embodiments mutually correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing functions, each network element, such as a transmit end device or a receive end device, includes a corresponding hardware structure and/or software module for performing each function. A person skilled in the art may be aware that units and algorithm steps in the examples described with reference to the embodiments disclosed in this specification may be implemented by hardware or a combination of computer software and hardware in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, a transmit end device or a receive end device may be divided into function modules based on the foregoing method examples. For example, each function module may be obtained through division based on a corresponding function, or two or more functions may be integrated into one processing module. The foregoing integrated module may be implemented in a form of hardware, or may be implemented in a form of a software function module. It should be noted that, in the embodiments of this application, division into the modules is an example, and is merely logical function division. In an actual implementation, another division manner may be used. An example in which function modules are obtained through division based on functions is used below for description.

Figure 7:
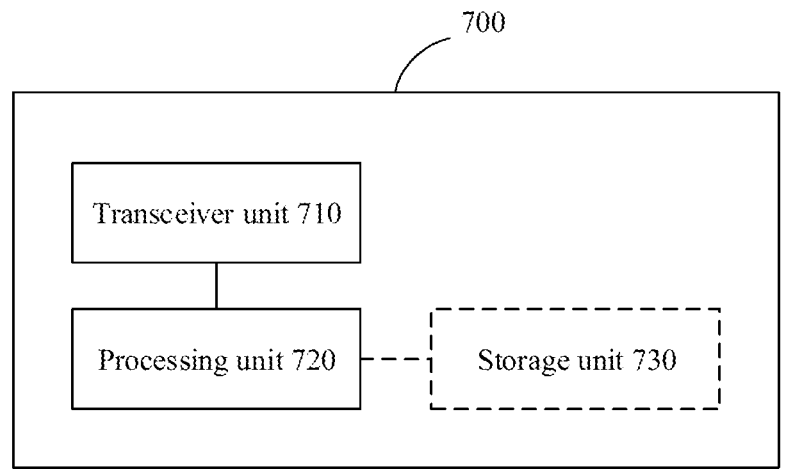
FIG. 7 is a schematic block diagram of a communication apparatus according to an embodiment of this application.

FIG. 7 is a schematic block diagram of a communication apparatus 700 according to an embodiment of this application. The communication apparatus 700 includes a transceiver unit 710 and a processing unit 720. The transceiver unit 710 may communicate with the outside, and the processing unit 720 is configured to process data. The transceiver unit 710 may also be referred to as a communication interface or a communication unit.

The communication apparatus 700 may be configured to perform an action performed by the terminal device in the foregoing method embodiments, or the communication apparatus 700 may be configured to perform an action performed by the network device in the foregoing method embodiments.

In a possible design, the communication apparatus 700 may be configured to perform an action performed by the terminal device in the foregoing method embodiments. In this case, the communication apparatus 700 may be the terminal device, or may be a component used in the terminal device. The transceiver unit 710 is configured to perform a sending/receiving-related operation on a terminal device side in the foregoing method embodiments, and the processing unit 720 is configured to perform a processing-related operation of the terminal device in the foregoing method embodiments.

In an implementation of this design, the transceiver unit 710 is configured to receive data in an active time of a current DRX cycle. The processing unit 720 is configured to: when a DRX inactivity timer of the current DRX cycle expires, determine that the terminal device enters a next DRX cycle, where if at least some data received in the active time is not associated with a DRX short cycle, the next DRX cycle is a DRX long cycle, or a type of the next DRX cycle is the same as that of a DRX cycle previous to the current DRX cycle. If at least one piece of data in the at least some data is associated with a DRX short cycle, the next DRX cycle is a DRX short cycle.

Optionally, the data that is not associated with a DRX short cycle includes any one or more of the following: data that is associated with a DRX long cycle, and data that is neither associated with a DRX long cycle nor associated with a DRX short cycle.

Optionally, the at least some data is data received in any time period shown in FIG. 5. For details, refer to the foregoing descriptions. Details are not described herein again.

Optionally, the transceiver unit 710 is further configured to receive configuration information of at least one data bearing medium from a network device, where the configuration information is used to indicate that the at least one data bearing medium is associated with a DRX short cycle or a DRX long cycle, and the at least some data includes data carried on the at least one data bearing medium.

Optionally, when the configuration information includes first identification information, it indicates the at least one data bearing medium is associated with a DRX short cycle; or when the configuration information includes second identification information, it indicates the at least one data bearing medium is associated with a DRX long cycle.

Optionally, when the configuration information includes third identification information, it indicates the at least one data bearing medium is associated with a DRX short cycle; when the configuration information does not include the third identification information, it indicates the at least one data bearing medium is associated with a DRX long cycle; or when the configuration information includes fourth identification information, it indicates the at least one data bearing medium is associated with a DRX long cycle; when the configuration information does not include the fourth identification information, it indicates the at least one data bearing medium is associated with a DRX short cycle.

Optionally, the at least one data bearing medium is any one of the following: a logical channel (LCH), a logical channel group (LCG), a data radio bearer (DRB), a quality of service flow (QoS Flow), and a protocol data unit session (PDU Session).

In another possible design, the communication apparatus 700 may be configured to perform an action performed by the network device in the foregoing method embodiments. In this case, the communication apparatus 700 may be the network device, or may be a component used in the network device. The transceiver unit 710 is configured to perform a sending/receiving-related operation on a network device side in the foregoing method embodiments, and the processing unit 720 is configured to perform a processing-related operation of the network device in the foregoing method embodiments.

In an implementation of this design, the processing unit 720 is configured to determine configuration information of a data bearing medium, where the configuration information is used to indicate the data bearing medium is associated with a DRX short cycle or a DRX long cycle. The transceiver unit 710 is configured to send the configuration information to a terminal device.

Optionally, when the configuration information includes first identification information, it indicates the data bearing medium is associated with a DRX short cycle; or when the configuration information includes second identification information, it indicates the data bearing medium is associated with a DRX long cycle.

Optionally, when the configuration information includes third identification information, it indicates the data bearing medium is associated with a DRX short cycle; when the configuration information does not include the third identification information, it indicates the data bearing medium is associated with a DRX long cycle; or when the configuration information includes fourth identification information, it indicates the data bearing medium is associated with a DRX long cycle; when the configuration information does not include the fourth identification information, it indicates the data bearing medium is associated with a DRX short cycle.

Optionally, the transceiver unit 710 is further configured to: when data to be sent to the terminal device corresponds to a delay-insensitive service, send the data to the terminal device by using a first data bearing medium, where the first data bearing medium is not associated with a DRX short cycle.

Optionally, the first data bearing medium is associated with a DRX long cycle. Alternatively, the first data bearing medium is neither associated with a DRX long cycle nor associated with a DRX short cycle.

Optionally, the transceiver unit 710 is further configured to: when the data to be sent to the terminal device corresponds to a delay-sensitive service, send the data to the terminal device by using a second data bearing medium, where the second data bearing medium is associated with a DRX short cycle.

Optionally, at least one data bearing medium is any one of the following: a logical channel (LCH), a logical channel group (LCG), a data radio bearer (DRB), a quality of service flow (QoS Flow), and a protocol data unit session (PDU Session).

It should be understood that the processing unit 720 in the foregoing embodiment may be implemented by a processor or a processor-related circuit, and the transceiver unit 710 may be implemented by a transceiver or an interface circuit-related circuit.

As shown in FIG. 7, optionally, the communication apparatus 700 may further include a storage unit 730, configured to store a computer program, and the processing unit 720 is configured to invoke the computer program from the storage unit 730 and run the computer program, so that the communication apparatus 700 performs the method on the terminal device side in the foregoing method embodiments, or performs the method on the network device side in the foregoing method embodiments.

Alternatively, optionally, the storage unit 730 may be configured to store data or other information.

The processing unit 720 and the storage unit 730 may be separated or integrated.

The storage unit 730 may be implemented by a memory or a memory-related circuit.

It should be understood that the processor mentioned in this embodiment of this application may be a central processing unit (CPU), another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

An embodiment of this application further provides a communication apparatus 800. The communication apparatus 800 may be a terminal device or a chip. The communication apparatus 800 may be configured to perform an action performed by the terminal device in the foregoing method embodiments.

Figure 8:
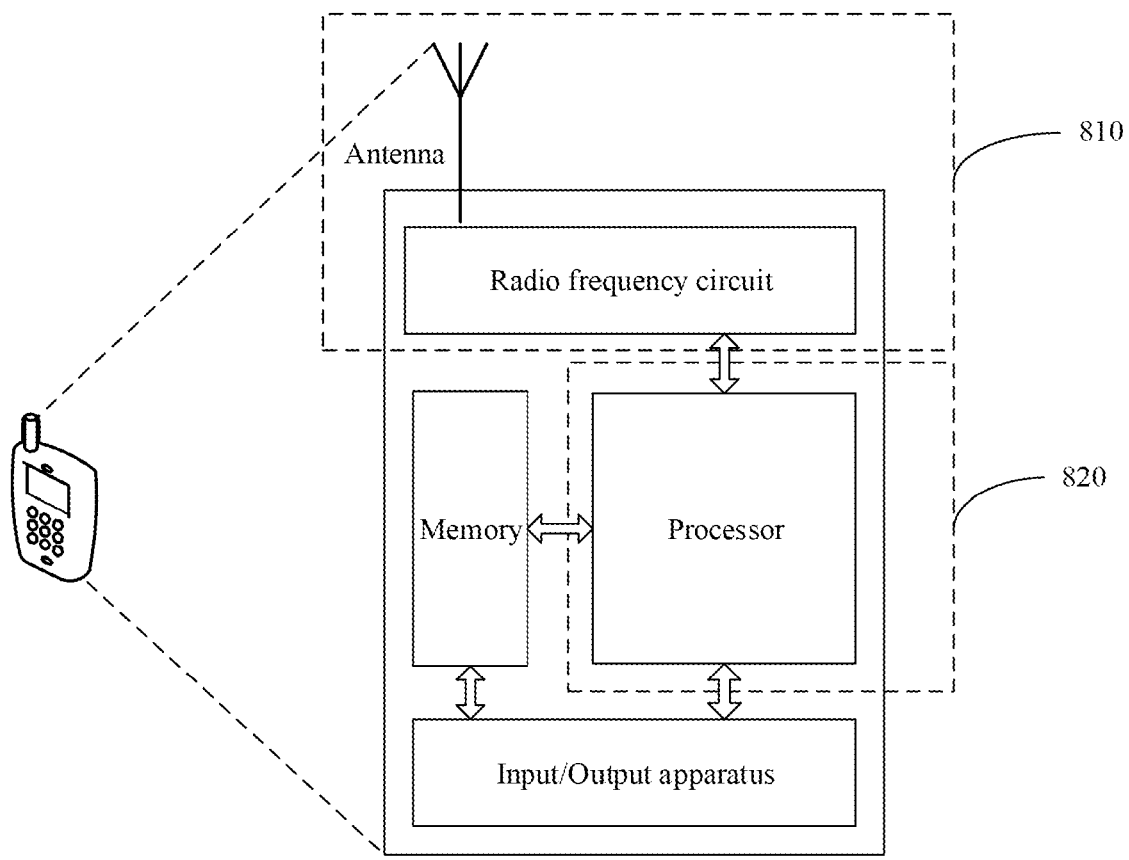
FIG. 8 is a schematic diagram of a structure of a terminal device according to an embodiment of this application.

When the communication apparatus 800 is a terminal device, FIG. 8 is a simplified schematic diagram of a structure of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display screen, or a keyboard, is mainly configured to: receive data entered by a user, and output data to the user. It should be noted that some types of terminal devices may have no input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have sending and receiving functions may be considered as a transceiver unit of the terminal device, and the processor that has a processing function may be considered as a processing unit of the terminal device.

As shown in FIG. 8, the terminal device includes a transceiver unit 810 and a processing unit 820. The transceiver unit 810 may also be referred to as a transceiver, a transceiver machine, a transceiver apparatus, or the like. The processing unit 820 may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 820 is configured to perform S420 in FIG. 4, and/or the processing unit 820 is further configured to perform other processing steps on a terminal device side in the embodiments of this application. The transceiver unit 810 is further configured to perform step S410 shown in FIG. 4, and/or the transceiver unit 810 is further configured to perform other sending and receiving steps on the terminal device side.

For example, in another implementation, the processing unit 820 is configured to perform the processing operation in step S630 in FIG. 6, and/or the processing unit 820 is further configured to perform other processing steps on the terminal device side in the embodiments of this application. The transceiver unit 810 is further configured to perform the receiving operations on the terminal device side in steps S610 and S620 shown in FIG. 6, and/or the transceiver unit 810 is further configured to perform other sending and receiving steps on the terminal device side.

It should be understood that FIG. 8 is merely an example instead of a limitation. The terminal device including the transceiver unit and the processing unit may not depend on the structure shown in FIG. 8.

When the communication apparatus 800 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication apparatus 900. The communication apparatus 900 may be a network device or a chip. The communication apparatus 900 may be configured to perform an action performed by the network device in the foregoing method embodiments.

Figure 9:
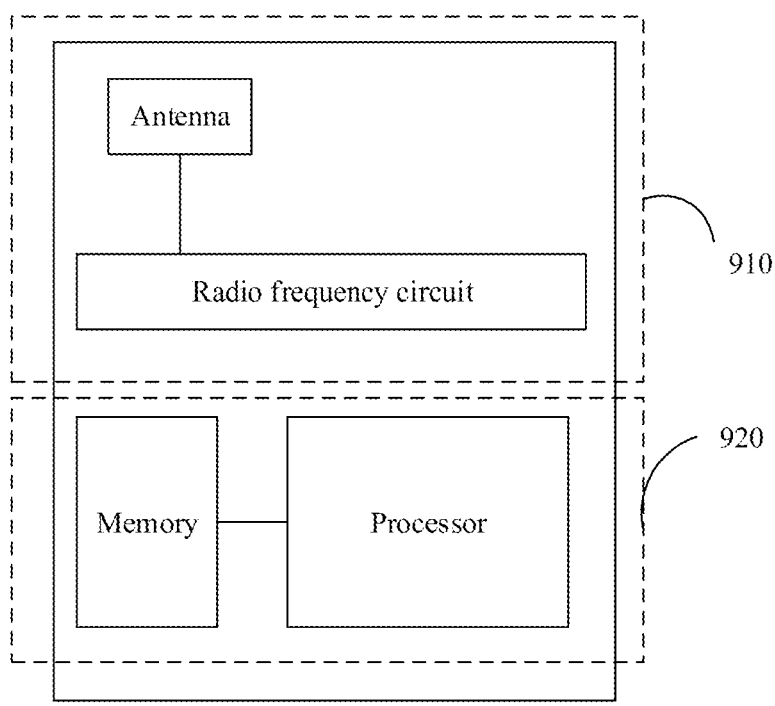
FIG. 9 is a schematic diagram of a structure of a network device according to an embodiment of this application.

When the communication apparatus 900 is a network device, for example, a base station, FIG. 9 is a simplified schematic diagram of a structure of the base station. The base station includes a part 910 and a part 920. The part 910 is mainly configured to: send and receive a radio frequency signal, and perform conversion between the radio frequency signal and a baseband signal. The part 920 is mainly configured to: perform baseband processing, control the base station, and the like. The part 910 may be usually referred to as a transceiver unit, a transceiver machine, a transceiver circuit, a transceiver, or the like. The part 920 is usually a control center of the base station, may usually be referred to as a processing unit, and is configured to control the base station to perform a processing operation on a network device side in the foregoing method embodiments.

The transceiver unit of the part 910 may also be referred to as a transceiver machine, a transceiver, or the like, and includes an antenna and a radio frequency unit. The radio frequency unit is mainly configured to perform radio frequency processing. Optionally, a component that is of the part 910 and that is configured to implement a receiving function may be considered as a receiving unit, and a component that is configured to implement a sending function may be considered as a sending unit. In other words, the part 910 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 920 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit in the part 910 is configured to perform the sending operations on the network device side in steps S610 and S620 in FIG. 6, and/or the transceiver unit in the part 910 is further configured to perform other sending and receiving steps on the network device side in the embodiments of this application. The processing unit in the part 920 is configured to perform the processing operation in step S620 in FIG. 6.

It should be understood that FIG. 9 is merely an example instead of a limitation. The network device including the transceiver unit and the processing unit may not depend on the structure shown in FIG. 9.

When the communication apparatus 900 is a chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium. The computer-readable storage medium stores a computer program. When the computer program is executed by a computer, the computer is enabled to implement the method on a terminal device side or the method on a network device side in the foregoing method embodiments.

An embodiment of this application further provides a computer program product including instructions. When the instructions are executed by a computer, the computer is enabled to implement the method on a terminal device side or the method on a network device side in the foregoing method embodiments.

An embodiment of this application further provides a communication system. The communication system includes the terminal device and the network device described in any one of the foregoing embodiments.

For explanations and beneficial effects of related content of any of the communication apparatuses provided above, refer to the corresponding method embodiment provided above, and details are not described herein again.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems, for example, a Linux operating system, a Unix operating system, an Android operating system, an iOS operating system, or a Windows operating system, that implement service processing by using a process. The application layer includes applications such as a browser, an address book, word processing software, and instant communication software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that can invoke and execute the program in the terminal device or the network device.

In addition, each aspect or feature of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel, and various other media that can store, include, and/or carry instructions and/or data.

A person of ordinary skill in the art may be aware that units and algorithm steps in the examples described with reference to the embodiments disclosed in this specification may be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied to a terminal device, the method comprising:
   receiving data in an active time of a current discontinuous reception (DRX) cycle; and
   when a DRX inactivity timer of the current DRX cycle expires, determining a type of a next DRX cycle depending on whether at least some data received in the active time is associated with a DRX short cycle, wherein
   if the at least some data is not associated with the DRX short cycle, the type of the next DRX cycle is determined in the determining to be a DRX long cycle, or the type of the next DRX cycle is determined in the determining to be the same as that of a DRX cycle previous to the current DRX cycle;
   wherein the method fu her comprises: selecting data received in a time period between a moment at wi ich a physical downlink control channel (PDCCH) for initial data transmission is successfully emodulated for the last time in the active time and the noment at which the DRX inactivity timer expires, and
   using the selected data as the at least some data for dete next DRX.

2. The method according to claim 1, wherein if at least one piece of data in the at least some data is associated with the DRX short cycle, the next DRX cycle is determined in the determining to be the DRX short cycle.

3. The method according to claim 1, wherein the method further comprises:
   receiving configuration information of at least one data bearing medium from a network device, wherein the configuration information indicates that the at least one data bearing medium is associated with the DRX short cycle or the DRX long cycle; and
   the at least some data comprises data carried on the at least one data bearing medium.

4. The method according to claim 3, wherein the configuration information comprises identification information, and the identification information indicates the at least one data bearing medium is associated with the DRX short cycle; or
   the configuration information does not comprise the identification information, and the configuration information indicates the at least one data bearing medium is associated with the DRX long cycle.

5. The method according to claim 3, wherein the configuration information comprises identification information, and the identification information indicates the at least one data bearing medium is associated with the DRX long cycle; or
   the configuration information does not comprise the identification information, and the configuration information indicates the at least one data bearing medium is associated with the DRX short cycle.

6. The method according to claim 3, wherein the at least one data bearing medium is any one of the following:
   a logical channel (LCH), a logical channel group (LCG), a combination of the LCH and the LCG, a data radio bearer (DRB), a quality of service flow (QOS) flow, and or a protocol data unit session PDU session.

7. The method according to claim 1, wherein the data that is not associated with the DRX short cycle comprises any one or more of the following:
   data that is associated with the DRX long cycle, or data that is neither associated with the DRX long cycle nor associated with the DRX short cycle.

8. A communications apparatus, comprising a processor, and a memory storing a program comprising instructions to be executed on the processor, enabling the apparatus to at least configured to:
   receive data in an active time of a current discontinuous reception (DRX) cycle; and
   when a DRX inactivity timer of the current DRX cycle expires, deser etermine a type of a next DRX cycle depending on whether at least some data received in the active time is associated with a DRX short cycle, wherein
   if the at least some data is not associated with the DRX short cycle, the type of the next DRX cycle is determined in the determination to be a DRX long cycle, or the type of the next DRX cycle is determined in the determination to be the same as that of a DRX cycle previous to the current DRX cycle;
   wherein the apparatus is further configured to: select data received in a time period between a moment at which physical downlink control channel (PDCCH) for initial data transmission is successfully demodulated for the last time in the active time and the moment at which the DRX inactivity timer expires; and use the selected data as the at least some data to determine the type of the next DRX cycle.

9. The apparatus according to claim 8, wherein if at least one piece of data in the at least some data is associated with the DRX short cycle, the next DRX cycle is determined in the determination to be the DRX short cycle.

10. The apparatus according to claim 8, wherein the apparatus is further configured to:
   receive configuration information of at least one data bearing medium from a network device, wherein the configuration information indicates that the at least one data bearing medium is associated with the DRX short cycle or the DRX long cycle; and
   the at least some data comprises data carried on the at least one data bearing medium.

11. The apparatus according to claim 10, wherein the configuration information comprises identification information, and the identification information indicates the at least one data bearing medium is associated with the DRX short cycle; or
   the configuration information does not comprise the identification information, and the configuration information indicates the at least one data bearing medium is associated with the DRX long cycle.

12. The apparatus according to claim 10, wherein the configuration information comprises identification information, and the identification information indicates the at least one data bearing medium is associated with the DRX long cycle; or
   the configuration information does not comprise the identification information, and the configuration information indicates the at least one data bearing medium is associated with the DRX short cycle.

* * * * *

UNITED STATES PATENT AND TRADEMARK OFFICE
CERTIFICATE OF CORRECTION

PATENT NO. : 12,156,278 B2
APPLICATION NO. : 17/485683
DATED : November 26, 2024
INVENTOR(S) : Lili Zheng et al.

It is certified that error appears in the above-identified patent and that said Letters Patent is hereby corrected as shown below:

In the Claims

Column 27, Line 62 to Column 28, Line 2, please delete the following incorrect paragraph:
"wherein the method fu her comprises: selecting data received in a time period between a moment at wi ich a physical downlink control channel (PDCCH) for initial data transmission is successfully emodulated for the last time in the active time and the noment at which the DRX inactivity timer expires, and
using the selected data as the at least some data for dete next DRX."

And replace with the following correct paragraph:
--wherein the method further comprises: selecting data received in a time period between a moment at which a physical downlink control channel (PDCCH) for initial data transmission is successfully demodulated for the last time in the active time and the moment at which the DRX inactivity timer expires, and
using the selected data as the at least some data for determining the type of the next DRX cycle.--

Signed and Sealed this
Fourth Day of February, 2025

Coke Morgan Stewart
*Acting Director of the United States Patent and Trademark Office*